Dec. 12, 1933.　　　D. M. BARDON　　　1,938,653
FISH LURE
Filed Aug. 29, 1928
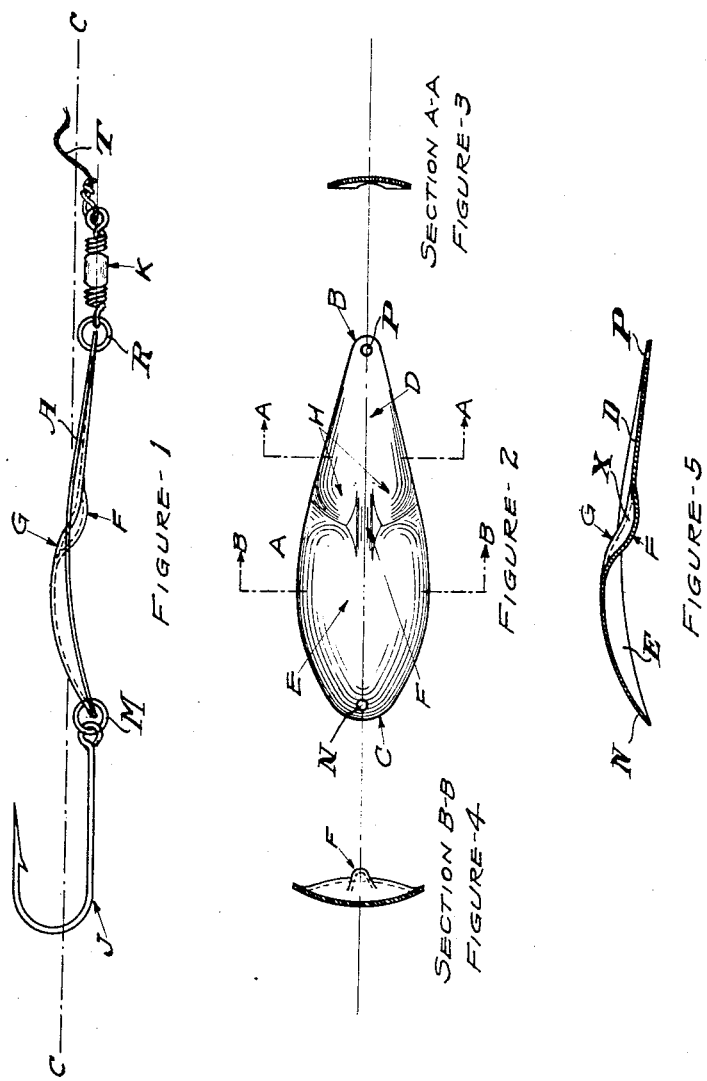
WITNESSES
INVENTOR
BY Donis M. Bardon Patented Dec. 12, 1933

1,938,653

UNITED STATES PATENT OFFICE 1,938,653

FISH LURE

Donis M. Bardon, Seattle, Wash.

Application August 29, 1928. Serial No. 302,778

5 Claims. (Cl. 43—42)

This invention relates to improvements in fish lures and has reference in particular to devices of that character commonly known as spoons, and which are used extensively in trolling for salmon and other kinds of fish; it being the principal object of this invention to provide a spoon that is so shaped that, in use, it will be given a natural "wiggle" most nearly simulating that of a minnow in the water.

A further object of the invention is to provide a spoon or lure with a distinctive and maximum amount of sheen, or flash, for attracting the fish from longer distances.

A still further object is to embody certain details of construction in the lure whereby it is enabled to maintain its equilibrium and action throughout a greater range of speed at which it may be pulled through the water.

Other objects reside in the improved details of construction and combination of parts as will be hereinafter described.

In accomplishing these objects, I have provided the improved details of construction, the preferred forms of which are illustrated in the accompanying drawing, wherein—

Figure 1 is a side elevation of a spoon embodied by the present invention.

Figure 2 is a plan view of the same.

Figure 3 is a cross section, taken on line A—A in Figure 2.

Figure 4 is a cross section taken on the line B—B in Figure 2.

Figure 5 is a section lengthwise of the spoon.

Referring more in detail to the drawing—

The body of the spoon, or lure, is designated in its entirety by the reference character A and it is formed, preferably, from a piece of polished sheet metal. The size of the spoon may vary but its shape should remain substantially as shown. The forward end of the spoon tapers to a somewhat elongated point, rounded off as at B, provided with an aperture P for receiving a ring R by means of which the spoon is attached to a line T through the intermediacy of the usual swivel K.

The rear end of the spoon is rounded off in rather an abrupt end C and this end also is perforated, N for receiving the ring, M for attachment of the hook J.

By reference to Figure 2 of the drawing, it will be seen that the spoon is somewhat oval in shape with the forward end extended in an elongated point; there are no abrupt turns or bends in the outline. In the forward end of the body is a spoon shaped depression D, rather shallow in depth and sloping gradually downward from the end and side edges of the body. It extends lengthwise of the body to substantially midway of its ends where it ends rather abruptly.

Viewing the spoon as shown in Figure 1, the rear, or hook end of the spoon is curved downwardly with respect to the forward end and this portion is given an upwardly formed spoon shaped depression E sloping gradually from the end and side edges of the body and terminating rather abruptly at approximately the center of the spoon by the same bend in the metal that terminates the depression D at the forward end of the spoon; this particular bend, as designated at G, is in the nature of a reverse curve leading forwardly into the converse curve H.

Formed in the medial line of the spoon at the base of the spoon shaped depression E, is a rib F, shown best in Figures 2 and 4, which merges into the reverse curve G and base portion of the depression D, forming a sort of gulley X as an outlet from the base end of the forward depression.

It will be observed from the drawing, that no portions of the spoon body are flat or straight, and in this respect it is a departure from the usual types of trolling spoons used, and it is this feature of construction which imparts to this lure the maximum amount of sheen or flash, as light will be generously reflected from all angles and positions.

It is to be noted also that the forward spoon shaped depression D merges into the oppositely formed depression E at the rear end of the spoon through the reverse curve G, and by this formation, the lure is caused to rock endwise. The converse curve H forces the flow of water toward the center, forming a crest on the axial line of the lure, causing a rocking motion sidewise. This double motion simulates the "wiggle" of a minnow, and the motion increases in extent as the speed at which the spoon is drawn through the water is increased, thus finally approaching the natural action of a live fish.

The rib F serves the three-fold purpose of adding strength to the spoon, adding reflecting surfaces and keeping the spoon on an even keel. It will be apparent also that the enlarged rear end portion of the spoon gives greater buoyancy at this point for carrying the added weight of the hook and for keeping the spoon on an even keel regardless of this added weight.

It is also to be observed that, since the spoon body is made up in its entirety of curves, it has the necessary stiffness and strength, permitting it to be made from very light material, rendering it very responsive to the action of the water. Also, since both ends of the spoon are tipped slightly in the same direction, it is prevented from abruptly turning first to one side then to the other, which is contrary to the natural action of the fish. This also prevents spinning or turning over.

Having thus described my invention, what I claim as new therein and desire to secure by Letters-Patent, is:

1. A fishing lure comprising an elongated body plate, with a rounded rear end portion and an extended, tapering forward end portion terminating in a rounded end, the opposite side edges of the plate having the same form of curve, the curves lying wholly on one side of a plane tangent thereto and the body of the plate adjacent its opposite ends having oppositely disposed spoon shaped depressions.

2. A fishing lure comprising an elongated body plate, with a rounded rear end portion and an extended, tapering forward end portion terminating in a rounded end, the opposite side edges of the plate having the same form of curve, the curves lying wholly on one side of a plane tangent thereto and the body of the plate adjacent its opposite ends having oppositely disposed spoon shaped depressions, said depressions converging at the medial portion of the spoon body in a reverse curve.

3. A fishing lure formed from an elongated, metal plate with its opposite end portions formed with oppositely depressed spoon shaped portions creating a converse curve at the point of convergence of the two depressions in the direction of the forward end of the spoon.

4. A fish lure formed by an elongated metal plate, the rear end of the plate being rounded off and of greater width than the forward end; the forward end being tapered substantially to a point, the plate having its rear end portion depressed beneath its horizontal plane and its forward portion similarly depressed in opposite relation thereto, and the two oppositely related depressions converging at the medial portion of the plate, with the opposite end portions of the plate being slightly inclined in the same direction from the horizontal plane, making the general contour of the lure slightly crescent shaped.

5. A fish lure comprising an elongated body plate, the opposite side edges of the plate having the same form of curve, the curve lying wholly on one side of a plane tangent thereto and the body of the plate having oppositely disposed spoon shaped depressions in its opposite end portions.

DONIS M. BARDON.